United States Patent [19]
Warren Van Deventer Wheeler

[11] Patent Number: 5,906,763
[45] Date of Patent: May 25, 1999

[54] STYLIZED INSULATOR AND INSULATING HEATING UNIT FOR A CONTAINER

[76] Inventor: Anne Warren Van Deventer Wheeler, 44 W. River St., Upton, Mass. 01568

[21] Appl. No.: 08/771,202

[22] Filed: Dec. 20, 1996

[51] Int. Cl.⁶ .............................. H05B 3/36; A63H 3/00
[52] U.S. Cl. ..................... 219/386; 219/535; 219/528; 206/457; 222/146.5; 446/73
[58] Field of Search .................................. 219/385, 386, 219/521, 528, 529, 535; 222/146.5, 146.2, 544, 545, 78; 206/457, 822; 221/46, 287; 446/73, 76, 77; 383/61, 78, 84; D9/436, 441

[56] References Cited

U.S. PATENT DOCUMENTS

| | | | |
|---|---|---|---|
| 3,791,550 | 2/1974 | Duncan | 206/457 |
| 4,065,660 | 12/1977 | Berard | 219/386 |
| 4,810,859 | 3/1989 | Anabtawi et al. | 219/528 |
| 5,210,396 | 5/1993 | Sanders | 219/521 |
| 5,231,266 | 7/1993 | Warren | 219/521 |
| 5,375,928 | 12/1994 | Yarng et al. | 206/457 |
| 5,386,909 | 2/1995 | Spector | 206/457 |
| 5,436,429 | 7/1995 | Cline | 219/528 |
| 5,601,469 | 2/1997 | Yang | 446/73 |
| 5,647,506 | 7/1997 | Julius | 221/46 |
| 5,702,003 | 12/1997 | Springer | 206/457 |

*Primary Examiner*—Teresa Walberg
*Assistant Examiner*—J. Pelham
*Attorney, Agent, or Firm*—Beck & Tysver, P.L.L.P.; Robert C. Beck; Stephanie J. Smith

[57] ABSTRACT

A stylized insulator and heating device for an electrically heated container. The heating device is adapted for positioning about the container. The insulator comprises a conformable and stylized body, which is removable attached to the heating unit and which removably covers at least the top of the container. The present invention increases the efficiency of the heated container by retaining the heat emitted thereby while still allowing access to the container.

21 Claims, 3 Drawing Sheets

STYLIZED INSULATOR AND INSULATING HEATING UNIT FOR A CONTAINER

FIELD OF THE INVENTION

The present invention relates generally to heating units, and more particularly to a stylized insulator and insulating heating unit for a container.

BACKGROUND OF THE INVENTION

Heated containers are often used to warm contents for various purposes. For example, cloth material used for child care, such as wiping cloths or towels for cleaning children and diapers, is often kept at a warm temperature in a heated container to increase the comfort when applied to the child. In other environments, such as health spas, liquids and towels for guests are oftened heated in containers. However these heated containers are not aesthetically appealing or energy efficient.

Thus there is need for an aesthetically appealing and energy efficient apparatus for maintaining the temperature of a container. The present invention addresses this as well as other needs.

SUMMARY OF THE INVENTION

To overcome the limitations described above, and to overcome other limitations that will become apparent upon reading and understanding the present specification, the present invention in one aspect discloses an insulator for a stylized electrically heated container. The insulator comprises a conformable stylized body which may removably cover the top of the container, thereby increasing the efficiency of the heated container by retaining the heat emitted thereby while still allowing access to the contents of the container.

These and various other advantages and features of the invention are pointed out with particularity in the claims affixed hereto then informing a part hereof. However, for a better understanding of the invention, its advantages, and the objects obtained by its use, a reference should be made to the drawings which form a further part hereof, and to the accompanying descriptive matter, in which there is illustrated and described specific exemplary embodiments of an apparatus in accordance with the invention.

BRIEF DESCRIPTION OF THE DRAWINGS

Referring now to the drawings in which like reference numerals represent corresponding parts throughout.

DETAILED DESCRIPTION OF THE DRAWINGS

In the following description of the exemplary embodiments, references made to the accompanying drawings which form a part hereof, and in which is shown by way of illustration specific embodiments in which the invention may be practiced. It is to be understood that other embodiments may utilize a structural or functional changes may be made without departing from the scope of the present invention.

Figure 1:
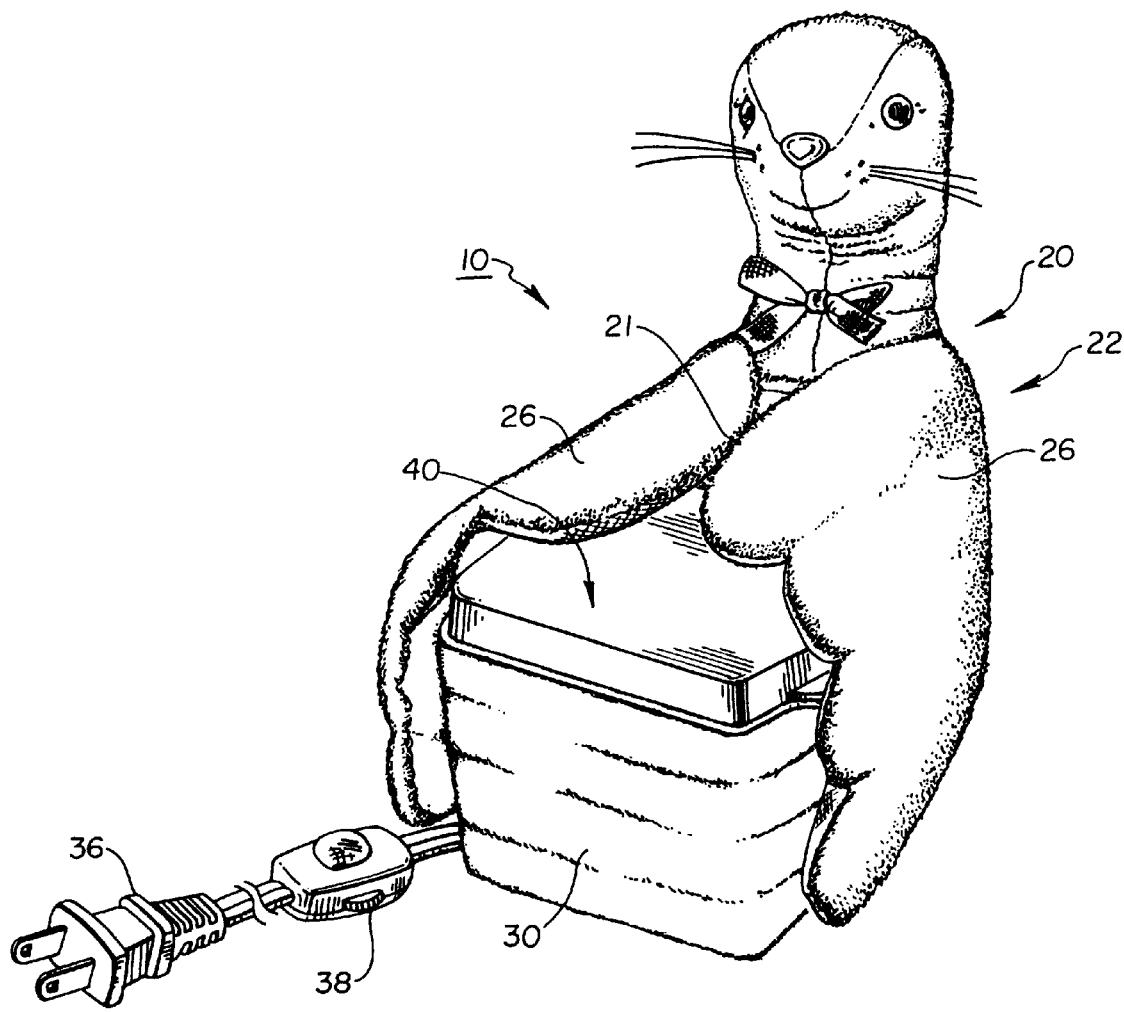
FIG. 1 is a perspective view of an insulating heating unit using a stylized insulator in accordance with the principles of the present invention.
Figure 2:
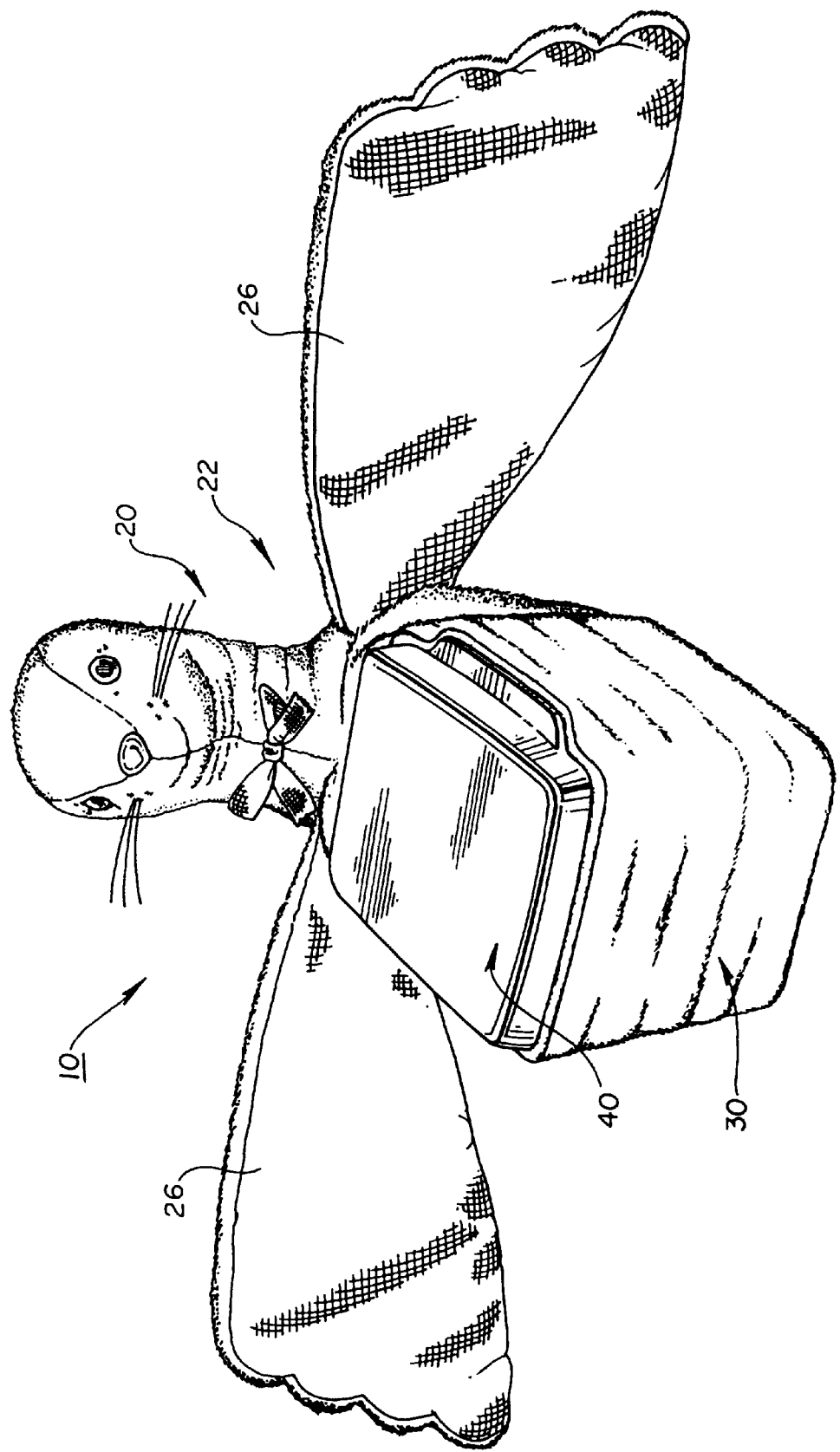
FIG. 2 is a perspective view of the insulator of FIG. 1 shown uncovered from a container.

FIGS. 1 and 2 are perspective views of an insulating heating unit 10 for a container 40. The container 40 may be one which holds, for example, material for child care, such as cloth wipes for cleaning a child, diapers etc. However, it should be appreciated that any object, including liquids, which a user may have a desire to heat, may be contained in the container 40. The heating unit 10 includes using an insulator 20 in accordance the principles of the present invention, and further includes an electrically powered heating device 30 which may be disposed about the container 40 and removably attached to the insulator 20. As will be described further below, the heating device 30 may include a heating pad and insulating material surrounding the heating pad.

The insulator 20 is preferably stylized and conformable. Its conformable nature allows the insulator 20 to cover at least the top of the container 40 (FIG. 1), increasing the efficiency of the heating device 30 by retaining the heat emitted thereby, and to uncover the container 40 (FIG. 2), allowing access to the contents of the container. The stylized nature of the insulator 20 not only provides an aesthetic appeal, but maintains the interest of child.

In the preferred embodiment, the insulator 20 comprises a stylized animal shaped body, such as a seal 22, having a central body 24 and a conformable portion 26, such as flippers. The conformable portion 26 may removably cover and insulate the top of the container 40 as well as the sides of the container 40, and the central portion 24 may insulate the rear of the container 40. To further secure and cover the container top, the flippers of the exemplary embodiment may be attached, e.g., sewn together, at location 21 as shown in FIG. 1. This would of course limit the extension of the flippers from that shown in FIG. 2.

Figure 3:
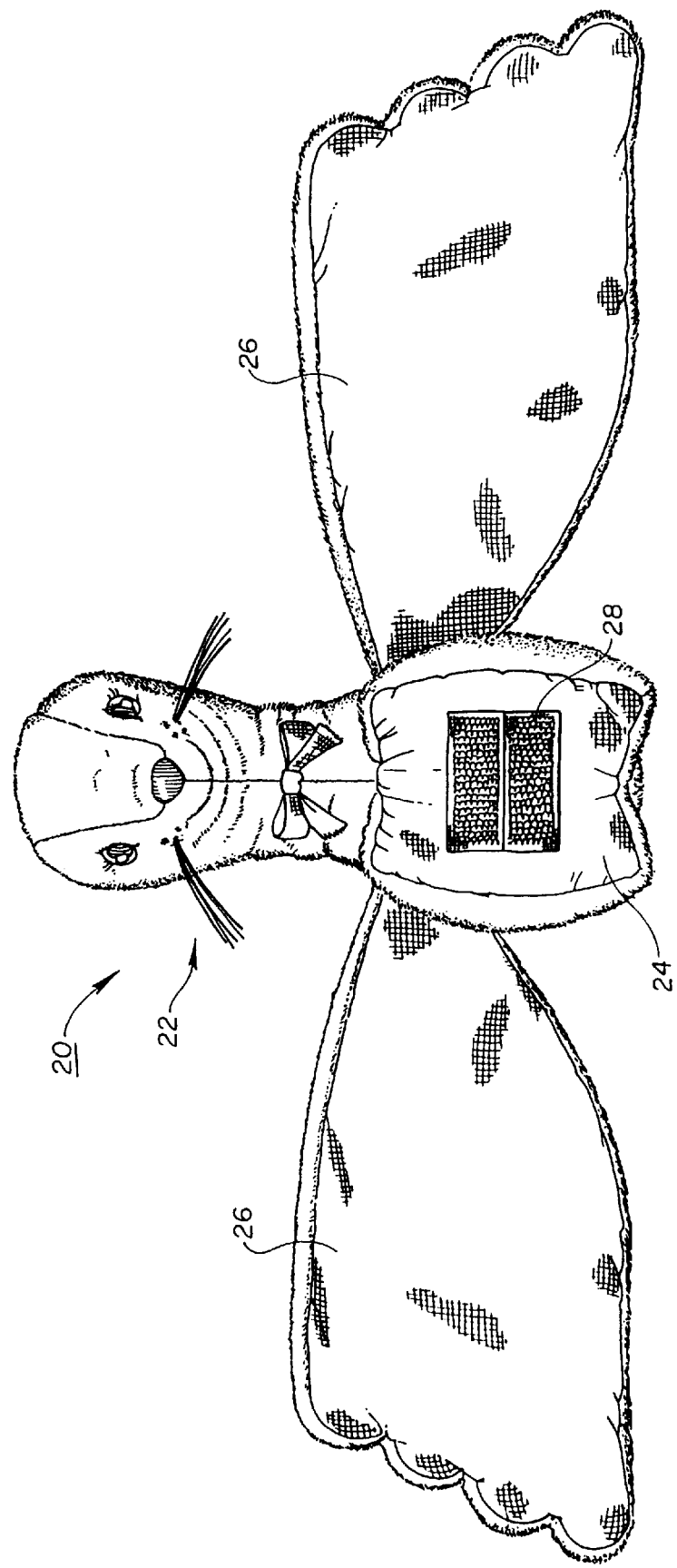
FIG. 3 is a front view of the insulator of FIG. 1.

Further details of the invention will be described with reference to FIGS. 3 and 4. FIG. 3 illustrates the insulator 20 detached from the container 40. For detachably mounting the insulator 20 to the container 40, a reusable adhesive material, such as velcro 28 may be disposed on the insulator 20, for example, at its central portion 24. This allows insulator 20 to be detached from the container 40 and used as a stand-alone object, such as a plaything in the case of an animal shaped body as shown. For example, by merely pulling gently, the seal 22 may be detached from the container 40 and used as a soft toy to keep a child occupied. The detachable nature of the stylized insulator 20 serves further purposes as well. It facilitates machine washability of the insulator 20 and heating device 30. The separability also allows the heating device 30 to be used alone. This is beneficial when space is a premium, for example, when traveling. The separability also facilitates washing or cleaning the insulator 20 or the insulating material 34 of the heating device 30.

To attach the velcro 28 to the insulator 20, the periphery of the velcro 28 may be sewn to the insulator 20. In one embodiment, a region of the periphery may be left unsewn so as to form a gap in which a hand may be inserted to use the insulator 20 as a puppet.

Figure 4:
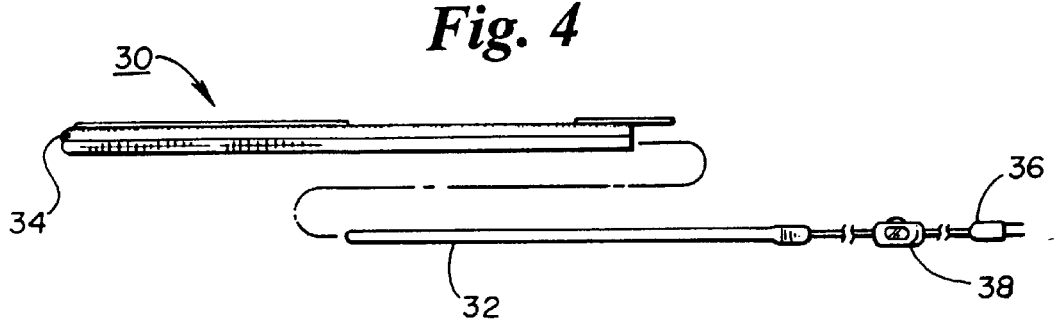
FIG. 4 shows further detail of the heating device of FIG. 1.

FIG. 4 illustrates further detail of the heating device 30. The heating device 30 may comprise a heating pad 32 and an insulating material 34 surrounding the heating pad 32. The heating pad 32 and insulating material 34 may be integrally formed or the heating pad 32 may be removably attached to the insulating material 34, for example, by providing a pocket in the insulating material 34 or through the use of velcro. Insulating material 34 and the stylized insulator 20 may furthermore each be made from a similar plush material thereby providing a uniform texture and appearance for the insulating heating unit 10. In this manner, the heating device 30 may form the rest of the body of the seal-shaped insulator.

The heating pad 32 may further include an electrical cord 36 having a light, such as a night light 38, for providing the dual functionality of indicating the location of and the power status of the heating unit 10. The use of a night light 38 in conjunction with the insulating heating unit 10 is particularly useful in a child care environment where, for example, a parent may not want an electrical device being operated near a child during certain times or where an older child or parent may be accessing the contents of the container 40 at night.

The illustration of the stylized insulator 20 in the form of a seal is shown by way of example, not of limitation. The stylized insulator 20 may take any number of forms, including the shape of other animals or objects. For example, stylized insulator 20 may comprise a rabbit with conformable ears extending to cover the top (and possibly sides) of the container 40.

The foregoing description of the exemplary embodiments of the invention has been presented for the purposes of illustration and description. It is not intended to be exhaustive or to limit the invention to the precise forms disclosed. Modifications and variations are possible in light of the above teaching. It is intended that the scope of the invention be limited not by this detailed description, but extend to cover the full and fair scope of the claims set forth below.

I claim:

1. A stylized insulated heating unit for a container, comprising:

an electrically powered heating device adapted for positioning about the container; and an insulator shaped like an animal with a central body portion and conformable appendages extending therefrom, said insulator being removably attached to the heating device for allowing the insulator to be used as a stand-alone object; and said appendages being removably coverable over at least the top of the container, thereby increasing the efficiency of the heating device by retaining the heat emitted thereby while still allowing access to the contents of the container.

2. The insulated heating unit of claim 1, wherein the heating device comprises a heating pad and an insulating material surrounding the heating pad.

3. The insulated heating unit of claim 2, wherein the insulating material and stylized insulator are each made from a similar material for providing a uniform texture and appearance for the insulated heating unit.

4. The insulated heating unit of claim 1, wherein the animal shape is a seal shape and the conformable portion comprises a pair of flippers for covering the container.

5. The insulated heating unit of claim 4, wherein the central portion includes reusable adhesive material for removably attaching the seal to the heating device.

6. The insulated heating unit of claim 4, wherein the conformable portion covers the sides and the top of the container.

7. The insulated heating unit of claim 6, wherein the central portion of the animal shaped insulator further covers the container.

8. The insulated heating unit of claim 1, wherein the heating unit includes an electrical cord having a light for providing the dual functionality of indicating the location of and power status of the insulated heating unit.

9. An insulator for an electrically heated child care container, comprising a central body and conformable appendages extending from said body, the insulator being shaped like an animal; and removably attachable to the container for allowing the insulator to be used as a stand-alone object as well as insulation; and said appendages being removably coverable over at least the top of the container, thereby increasing the efficiency of the heated container by retaining the heat emitted thereby while still allowing access to the contents of the container.

10. The stylized insulator of claim 9, wherein the heating device comprises a heating pad and an insulating material surrounding the heating pad, the insulating material and the stylized body each being made from a similar material for providing a uniform texture and appearance for the insulator.

11. The stylized insulator of claim 9, wherein the animal shape is a seal shape and the at least one conformable limb comprises a pair of flippers for covering the top and sides of the container.

12. An insulated heating unit for a child care container, comprising:

an electrically powered heating device adapted for positioning about the container; and a conformable, animal-shaped insulator having a central body portion and conformable appendages extending therefrom for removably covering at least the top of the container, thereby increasing the efficiency of the heating device by retaining the heat emitted thereby while still allowing access to the contents of the container.

13. The insulated heating unit of claim 12, wherein the animal shape is a seal shape and the conformable portion comprises a pair of flippers for covering the container.

14. The insulated heating unit of claim 12, wherein stylized insulator is removably attachable to the heating device, thereby allowing the animal shaped insulator to be used both as insulation and as a plaything.

15. An insulator for an electrically heated wipe container, comprising an animal-shaped body, the stylized animal-shaped body having a conformable appendage extending therefrom for removably covering at least the top of the container, thereby increasing the efficiency of the heated container by retaining the heat emitted thereby while still allowing access to the contents of the wipe container.

16. The stylized insulator of claim 15, wherein the animal-shaped body is removably attachable to the heating device, thereby allowing the animal-shaped body to be used both as insulation and as a plaything.

17. The stylized insulator of claim 15, wherein the animal-shaped body is seal-shaped and the conformable portion comprises a pair of flippers.

18. The stylized insulator of claim 15, further including an adhesive material attached to the animal-shaped body for removably attaching the animal-shaped body to the heating device, the removable adhesive being attached to the animal-shaped body to form a pocket such that the animal-shaped body may be used as a puppet.

19. An insulator according to claim 15 wherein two appendages extend in opposite directions from said body.

20. An insulator according to claim 19 wherein the insulator is shaped like a seal and said appendages represent front flippers on the seal.

21. An insulator according to claim 12 wherein said insulator is removable from said heating device without removing said heating device from the container.

* * * * *